(12) United States Patent
Zastrozynski et al.

(10) Patent No.: US 8,641,331 B2
(45) Date of Patent: Feb. 4, 2014

(54) MILLING CUTTING INSERT

(75) Inventors: Jürgen Zastrozynski, Düsseldorf (DE); Carsten Schwaner, Mülheim/Ruhr (DE); Andreas Wessel, Gelsenkirchen (DE); Richard Fischer, Weihenszell (DE); Martin Hausmann, Ratingen (DE)

(73) Assignee: Kennametal Inc., Latrobe, PA (US)

( * ) Notice: Subject to any disclaimer, the term of this patent is extended or adjusted under 35 U.S.C. 154(b) by 133 days.

(21) Appl. No.: 13/319,112

(22) PCT Filed: Mar. 24, 2010

(86) PCT No.: PCT/EP2010/001829
§ 371 (c)(1),
(2), (4) Date: Nov. 7, 2011

(87) PCT Pub. No.: WO2010/127743
PCT Pub. Date: Nov. 11, 2010

(65) Prior Publication Data
US 2012/0057943 A1    Mar. 8, 2012

(30) Foreign Application Priority Data
May 8, 2009    (DE) .......................... 10 2009 020 373

(51) Int. Cl.
*B23B 27/14*    (2006.01)

(52) U.S. Cl.
USPC .............................. 407/113; 407/115; 407/42

(58) Field of Classification Search
USPC .................... 407/113, 114, 115, 116
See application file for complete search history.

(56) References Cited

U.S. PATENT DOCUMENTS

| 5,951,214 | A | 9/1999 | Rothballer |
| 7,252,461 | B2 * | 8/2007 | Karonen ....................... 407/113 |
| 2007/0071559 | A1 * | 3/2007 | Koskinen ........................ 407/34 |
| 2008/0232912 | A1 * | 9/2008 | Bhagath ........................ 407/114 |
| 2009/0155004 | A1 * | 6/2009 | Jansson ........................... 407/40 |

FOREIGN PATENT DOCUMENTS

| CN | 1443619 A | 9/2003 |
| DE | 93 20 448 U1 | 7/1994 |
| EP | 457488 A1 | 11/1991 |
| EP | 502541 A1 * | 9/1992 |
| EP | 0 672 492 A1 | 9/1995 |
| JP | 08300214 A * | 11/1996 |
| JP | 09207007 A * | 8/1997 |
| JP | 11179611 A * | 7/1999 |
| JP | 2004001219 A * | 1/2004 |
| WO | 9635538 A1 | 11/1996 |

* cited by examiner

*Primary Examiner* — Daniel Howell
*Assistant Examiner* — Nicole N Ramos
(74) *Attorney, Agent, or Firm* — Larry R. Meenan, Esq.

(57) ABSTRACT

The invention relates to a milling cutting insert having a square or triangular shaped cutting face delimited in the plan view by a peripheral cutting edge having linear cutting edges (10) and curved cutting corners (11). According to the invention, each of the cutting edges (10) comprises an inclined region (10a) sloping toward a cutting corner (11), extending beyond the tangential point (14) determined by the point at which the linear cutting edge (10) transitions into a curved cutting corner (11), wherein adjacent thereto the cutting edge (10b) rises prior to the point (24) determined by a cutting corner angle bisector (15), wherein said rising region (10b) extends to a cutting edge maximum (17) on the other side of the cutting corner (11) on the adjacent cutting edge (10), which is linear in plan view, from where the cutting edge (10) continues, again inclined and sloping downward, resulting in a rotationally symmetric form having identically shaped cutting edges.

19 Claims, 2 Drawing Sheets

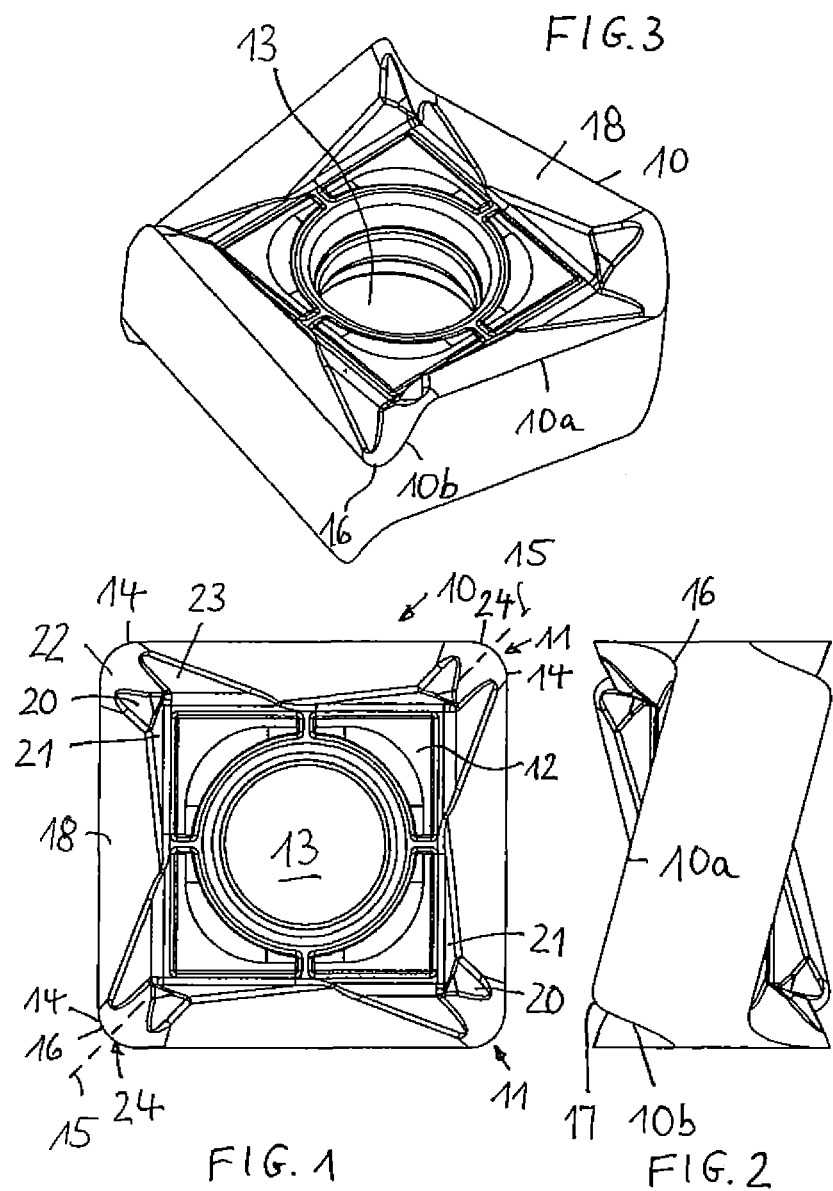

MILLING CUTTING INSERT

CLAIM TO PRIORITY

This application is a National Phase of International Application PCT/EP2010/001829, filed on Mar. 24, 2010, which claims priority to German Application No. 10 2009 020 373.7, filed on May 8, 2009, the entire contents of all these applications are incorporated herein by reference.

BACKGROUND OF THE INVENTION

1. Field of the Invention

The invention relates to a milling cutting insert having a square or triangular rake face which, as seen in plan view, is defined by a circumferential cutting edge having linear cutting edges and curved cutting corners.

2. Description of Related Art

During the "corner milling" of 90° shoulders, milling cutters are required which are fitted with cutting inserts which have a main lip and a facing lip (for smoothing the cut surface). The clamped cutting inserts project both beyond the end face of the rotatable tool holder and also laterally in order to be able to both produce the vertical wall parts and finish the cut bed wall. In most milling cutters, the cutting depth $a_p$ that can be achieved is limited by the length of the main lip. This becomes clear in particular in the usually lozenge-shaped cutting inserts, in which only in each case two opposite cutting corners with adjoining main and facing lips can be used on the rake face. A greater cutting depth is certainly provided by the cutting insert according to DE 601 12 993 T2, in which the acute-angled cutting corner is modified owing to the fact that the cutting edge sections directly adjoining the cutting corner are disposed substantially perpendicularly to one another, but here, too, the size of the main lips is restricted by the corresponding adjoining vertically arranged section. It is also known from said document that the cutting edge is designed to run in a downward-sloping manner toward an obtuse-angled corner.

SUMMARY OF THE INVENTION

The object of the present invention is to provide a cutting insert having a rake face which has a plurality of useful cutting edges and cutting corners, wherein the cutting insert clamped in a milling tool allows the milling of a 90° shoulder with high surface quality of the base machined by the facing lip, at low power consumption.

This object is achieved by a cutting insert according to claim 1, which has the following features:

The milling cutting insert has a square or triangular rake face which, as seen in plan view, is defined by a circumferential cutting edge having linear cutting edges and curved cutting corners. Each of the cutting edges has a sloping region which is inclined in the direction of a cutting corner and which extends beyond the tangential point, which is determined by the point at which the linear cutting edge merges into the curved cutting corner. The cutting edge then still rises before the point determined by a cutting corner angle bisector, wherein this rising region extends up to a cutting edge maximum which lies on the other side of the cutting corner on the adjacent cutting edge, which is linear in plan view, from where the cutting edge, in continuation, is designed to slope downward again, thereby resulting overall in a rotationally symmetrical form of the cutting insert with identically configured cutting edges. This is a 90° rotationally symmetrical form with 4 equally long cutting edges in a square cutting insert and a 120° rotationally symmetrical form with 3 equally long cutting edges in a triangular cutting insert.

The advantage of the design described above lies in the fact that each of the 4 lips can be used as facing and main lip and that, as a result of the special contour of the cutting edge profile, greater cutting depths $a_p$ are possible compared with the milling cutting inserts known according to the prior art. During the cutting, the milling cutter uses less power than milling cutters having conventional cutting inserts.

Developments of the invention are described in the dependent claims.

Thus, the cutting edge minimum and the cutting edge maximum following in continuation of the cutting edge, which are defined as the deepest and highest cutting edge points, preferably lie within the same cutting corner. This means that the height adjustment between the cutting edge minimum and the cutting edge maximum is effected in the region of the cutting corner.

Furthermore, an identically designed rake face with corresponding cutting edges and cutting corners of the above-described type, which are connected to one another by circumferential flanks or in which the flanks each form cutting edges with the two opposite rake faces, is preferably provided on opposite sides. The cutting insert is symmetrical to a center plane arranged between the rake faces. The advantage of this cutting insert consists in the fact that 8 cutting edges can be used one after the other in a square cutting insert and 6 cutting edges can be used one after the other in a triangular cutting insert.

In order to ensure secure seating of the cutting insert in a tool holder (milling cutter), a central planar plateau extends preferably around a central fastening hole. Alternatively, planar plateau regions arranged in an axially and rotationally symmetrical manner around the fastening hole can extend as seating surfaces. The tool holder (milling cutter parent body) has correspondingly designed seating surfaces and, in the rear region, further recesses which enable the cutting edge regions and cutting corner regions projecting beyond the seating regions to be accommodated without contact.

For a smooth cut, it has proved to be especially advantageous if the deepest cutting edge point lies below the seating region or the seating regions and/or if the cutting edge maximum lies above the plane determined by the seating region or the seating regions.

Furthermore, the rake face sections adjoining the cutting edges are preferably arranged at a positive rake angle. According to a special embodiment of the invention, the cutting edge radius is between 0.8 mm and 1.6 mm, preferably between 0.8 mm and 1.2 mm.

Furthermore, the sloping cutting edge region is preferably arranged at an angle of inclination of 10° to 20° (relative to the seating surface). The region over which the cutting edge rises is (as seen in plan view) about ⅙ to ⅐ as long as the distance between two cutting corners. In particular, in a further embodiment of the invention, the rising region of the cutting edge is of concave design in the lower part and of convex design in the upper part.

The flanks are preferably of planar or slightly concave design in order to form a clearance angle >0°. Finally, in a concrete embodiment, the cutting edge maxima project above the rake face plateau (on the same side) by 1.5 mm to 2 mm; whereas the cutting edge minimum is 0.5 mm to 0.8 mm below this rake face plateau (on the same side).

BRIEF DESCRIPTION OF THE DRAWINGS

Further advantages of the invention and concrete embodiments are explained in more detail below with reference to the drawings, in which:

FIG. 1 shows a plan view of a cutting insert according to the invention,

FIG. 2 shows a side view of the cutting insert according to FIG. 1,

FIG. 3 shows a perspective view of the cutting insert according to FIG. 1 or 2,

DETAILED DESCRIPTION OF THE INVENTION

Figure 4:
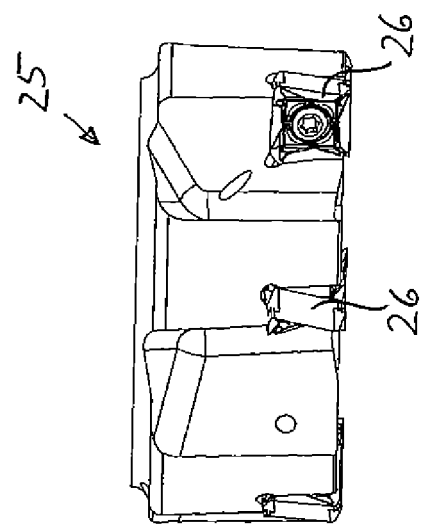
FIG. 4 shows a perspective view of a corner milling cutter.

The cutting insert according to FIGS. 1 to 3 has four cutting edges 10 arranged at right angles to one another and four cutting corners 11 which connect the cutting edges 10 to one another and are of round design, for example via a radius of 1.2 mm. Four planar seating regions 12 extend around a central fastening hole 13 for receiving a clamping screw. The present cutting insert is designed as an indexable cutting tip which has two rake faces which are arranged on opposite sides and are each defined by cutting edges and cutting corners of identical design. Since the cutting edges project above the planes in which the seating regions 12 lie, a corresponding undercut space must be provided next to the seating surface in the tool holder, which will be dealt with in more detail with reference to FIGS. 4 and 5, on account of which space it is possible to clamp the cutting inserts in place without the cutting edges that are currently not being used being exposed to a clamping pressure in the tool holder.

In the present case, the four plateau-shaped seating regions 12 consist of similarly formed surface elements which are defined on two sides by boundary lines at right angles to one another and otherwise substantially by a curved line. Roughly groove-shaped short recesses, as can be seen in FIG. 1, can also be provided between the four seating regions 12.

The essence of the present invention consists in the fact that each of the cutting edges has a sloping region 10a which is inclined in the direction of a cutting corner 11 and which extends beyond the tangential point 14 in the direction of the line of intersection with an angle bisector 15. In the present case, a point 16 forms the cutting edge minimum and lies between said points 14 and the point of intersection of the cutting corner with the angle bisector 15. Following this sloping region 10a, the cutting edge 10b rises up to a maximum 17, the cutting edge running first of all concavely and then convexly to the cutting edge maximum 17. The cutting edge maximum 17 lies distinctly above the plane which is determined by the seating regions 12, whereas the point 16 lies below this plane. Following the maximum 17, the cutting edge slopes downward again in the region 10a, thereby resulting in an overall form which has 90° rotational symmetry. Each of the cutting edge regions 10a, 10b can therefore be used as a main lip and as a facing lip in successive cutting operations after the indexable cutting tip is turned and re-clamped.

Following the cutting edge 10, the cutting insert has a rake face region 18 which can be inclined at a positive rake angle of 10° to 30°, preferably 20°. The rake face region 18 can also be of slightly convex design. In the region of the maximum 17, the rake face has a rounded-off crest 19, to which a roughly triangular rake face region 20 and, therebehind, with a partly lateral offset, a triangular rake face region 21 formed with an acute angle and having considerably larger rake angles extend. Toward the corner, i.e. in the direction of the cutting edge minimum 16, the rake face region 22 is arched convexly and in a steeply sloping manner. Rake face regions running out flat at a small angle of inclination follow as rake face regions 23.

Figure 5:
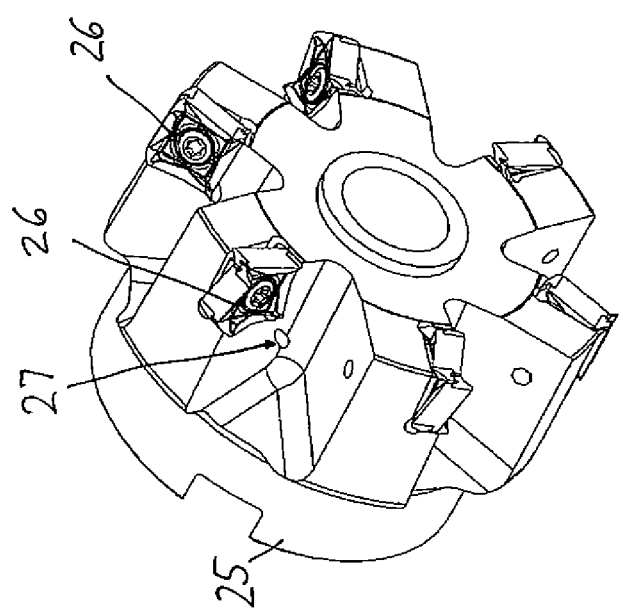
FIG. 5 shows a side view of the milling cutter of FIG. 4.

As can be seen from FIG. 4, a tool holder 25 serves to accommodate a plurality of cutting inserts 26 according to FIGS. 1 to 3. To accommodate the cutting inserts, the tool holder 25 has respective pocket-shaped receptacles which are suitable for securely accommodating the cutting insert designed with double-sided rake face, the plateau surfaces 12 serving as seating surfaces which are clamped against a correspondingly designed seating surface in the tool holder seat. Serving as clamping means is a fastening screw which is inserted via the fastening hole and is screwed to the tool holder 25. In the present case, the tool holder has six cutting inserts, the two adjoining cutting edges of which project on the lateral side and at the end face, such that the milling cutter is suitable for forming a 90° shoulder. An (internal) coolant feed is designated by 27.

Cutting edge designs according to the invention can also be realized in those cutting inserts which have, as seen in plan view, a triangular rake face configuration which is defined by 3 equally long cutting edges.

What is claimed is:

1. A cutting insert, comprising:
a top surface and a plurality of side surfaces;
a plurality of cutting edges; a first cutting edge formed at an intersection between the top surface and a first side surface, the first cutting edge merging into a curved cutting corner at a first tangential point; and
a second cutting edge formed at an intersection between the top surface and a second side surface, the second cutting edge merging into the curved cutting corner at a second tangential point,
wherein each cutting edge includes a sloping region and a rising region, and
wherein the sloping region linearly increases in height along the first side surface towards the curved cutting corner to a maximum point extending beyond the first tangential point of the first side surface,
wherein the rising region extends from a minimum point located between the second tangential point of the second side surface and an angle bisector of the curved cutting corner to the maximum point of the first cutting edge, thereby resulting in a cutting insert with a rotationally symmetrical form having identically configured cutting edges; and
wherein the top surface further includes a plurality of rake face regions adjoining the cutting edges in a rotationally symmetrical manner with respect to the angle bisector.

2. The cutting insert according to claim 1, wherein the minimum point and the maximum point for the first cutting edge are located between the first tangential point and the second tangential point.

3. The cutting insert according to claim 1, wherein the rake face regions have a positive rake angle.

4. The cutting insert according to claim 3, wherein the rake angle is between 10 degrees and 30 degrees.

5. The cutting insert according to claim 1, wherein the rake face regions have a convex design.

6. The cutting insert according to claim 1, wherein the rising region is of concave design proximate the minimum point and of convex design proximate the maximum point.

7. The cutting insert according to claim 1, wherein the curved cutting corner has a radius between 0.8 mm and 1.6 mm.

8. The cutting insert according to claim 1, wherein the rising region increases in height from the minimum point to the maximum point between ⅙ and ⅐ of a length of the first side surface.

9. The cutting insert according to claim 1, wherein the rising region is of concave design proximate the minimum point and of convex design proximate the maximum point.

10. A cutting insert, comprising:
a top surface and plurality of side surfaces;
a plurality of cutting edges; a first cutting edge formed at an intersection between the top surface and a first side surface, the first cutting edge merging into a curved cutting corner at a first tangential point; and
a second cutting edge formed at an intersection between the top surface and a second side surface, the second cutting edge merging into the curved cutting corner at a second tangential point,
wherein each cutting edge includes a sloping region and a rising region, and
wherein the sloping region linearly increases in height along the first side surface towards the curved cutting corner to a maximum point extending beyond the first tangential point of the first side surface,
wherein the rising region extends from a minimum point located between the second tangential point of the second side surface and an angle bisector of the curved cutting corner to the maximum point of the first cutting edge, thereby resulting in a cutting insert with a rotationally symmetrical form having identically configured cutting edges, and
wherein the top surface further includes a plurality of symmetrical planar seating regions disposed about a central fastening hole in a rotationally symmetrical manner with respect to the angle bisector.

11. The cutting insert according to claim 10, wherein plurality of planar seating regions define a plane, and wherein the minimum point is located below the plane and the maximum point is located above the plane.

12. The cutting insert according to claim 11, wherein the maximum point is located above the plane by 1.5 mm to 2 mm, and wherein the minimum point is located below the plane by 0.8 mm to 0.5 mm.

13. The cutting insert according to claim 11, wherein the sloping region has an angle of inclination of 10° to 20° with respect to the plane.

14. The cutting insert according to claim 10, wherein the curved cutting corner has a radius between 0.8 mm and 1.6 mm.

15. The cutting insert according to claim 10, wherein the rising region increases in height from the minimum point to the maximum point between ⅙ and ⅐ of a length of the first side surface.

16. The cutting insert according to claim 10, wherein the rising region is of concave design proximate the minimum point and of convex design proximate the maximum point.

17. A cutting insert, comprising:
a top surface and a plurality of side surfaces;
a plurality of cutting edges; a first cutting edge formed at an intersection between the top surface and a first side surface, the first cutting edge merging into a curved cutting corner at a first tangential point; and
a second cutting edge formed at an intersection between the top surface and a second side surface, the second cutting edge merging into the curved cutting corner at a second tangential point,
wherein each cutting edge includes a sloping region and a rising region, and
wherein the sloping region linearly increases in height along the first side surface towards the curved cutting corner to a maximum point extending beyond the first tangential point of the first side surface,
wherein the rising region extends from a minimum point located between the second tangential point of the second side surface and an angle bisector of the curved cutting corner to the maximum point of the first cutting edge, thereby resulting in a cutting insert with a rotationally symmetrical form having identically configured cutting edges, and
wherein the cutting insert comprises four cutting edges arranged at right angles to one another, and four curved cutting corners connecting the cutting edges.

18. The cutting insert according to claim 17, wherein the curved cutting corner has a radius between 0.8 mm and 1.6 mm.

19. The cutting insert according to claim 17, wherein the rising region increases in height from the minimum point to the maximum point between ⅙ and ⅐ of a length of the first side surface.

* * * * *